US012776600B2

(12) United States Patent
Chen et al.

(10) Patent No.: US 12,776,600 B2
(45) Date of Patent: Oct. 27, 2026

(54) CONNECTOR WITH A SLOT FOR A SMALL CIRCUIT BOARD

(71) Applicant: Quanta Computer Inc., Taoyuan City (TW)

(72) Inventors: Chao-Jung Chen, Taoyuan City (TW); Hou-Hsien Chang, Taoyuan City (TW)

(73) Assignee: Quanta Computer Inc., Taoyuan City (TW)

( * ) Notice: Subject to any disclaimer, the term of this patent is extended or adjusted under 35 U.S.C. 154(b) by 449 days.

(21) Appl. No.: 18/486,155

(22) Filed: Oct. 12, 2023

(65) Prior Publication Data

US 2024/0039194 A1 Feb. 1, 2024

Related U.S. Application Data

(62) Division of application No. 16/998,752, filed on Aug. 20, 2020, now Pat. No. 11,824,292.

(60) Provisional application No. 63/034,803, filed on Jun. 4, 2020.

(51) Int. Cl.
*H01R 12/71* (2011.01)
*H01R 12/72* (2011.01)

(52) U.S. Cl.
CPC ......... *H01R 12/721* (2013.01); *H01R 12/716* (2013.01)

(58) Field of Classification Search
CPC .............. H01R 12/7076; H01R 12/716; H01R 12/721; H01R 12/71; H01R 12/72; H01R 13/2435; H01R 13/6658; H01R 24/60
USPC ...................................................... 361/679.02
See application file for complete search history.

(56) References Cited

U.S. PATENT DOCUMENTS 8,896,463 B2 * 11/2014 Brennan ................ G01D 4/004 702/122
2008/0024115 A1 * 1/2008 Makinson ............ G01R 22/065 439/517
2020/0313323 A1 10/2020 Qiao et al.
2022/0131323 A1 4/2022 Lin

* cited by examiner

*Primary Examiner* — Timothy J Thompson
*Assistant Examiner* — Guillermo J Egoavil
(74) *Attorney, Agent, or Firm* — Nixon Peabody LLP

(57) ABSTRACT

A connector consisting of a body, a first slot, a second slot, a first terminal, and a second terminal is disclosed. The first slot is provided on the body to receive a first printed circuit board (PCB). The second slot is provided on the body to receive a second PCB. The first slot and the second slot are separate and distinct slots. When the first PCB and the second PCB are received in the first slot and the second slot, respectively, the first terminal electrically connects the first PCB and the second PCB, and the second terminal connects to only the second PCB. Providing the first slot on the connector allows adding expansion cards, control cards, and the like to enhance functionality of computing systems.

10 Claims, 7 Drawing Sheets

CONNECTOR WITH A SLOT FOR A SMALL CIRCUIT BOARD

CROSS-REFERENCED TO RELATED APPLICATIONS

This patent application is a divisional of U.S. patent application Ser. No. 16/998,752, filed on Aug. 20, 2020, now allowed, which claims the benefit of U.S. Provisional Patent Application No. 63/034,803, filed Jun. 4, 2020, each of which is hereby incorporated by reference in the present application.

TECHNICAL FIELD

The present disclosure relates generally to systems and methods for adding expansion slots to electronic connectors.

BACKGROUND

Computing systems (e.g., desktop computers, blade servers, rack-mount servers, etc.) are employed in large numbers in various applications. Computing systems employ connectors of various types to ensure that components of the computing systems are able to communicate with each other or with other computing systems. The connectors can provide an interface between distinct components, thereby allowing power and/or communication signals to flow between the distinct components. In some cases, connectors are simple and not readily identifiable without looking for identifiable marks on the connector. In some cases, connectors are unable to both receive memory modules or other control cards, and facilitate communication with components of computing systems. Thus, the present disclosure is directed at solving problems related to providing expansion slots on connectors for various purposes.

SUMMARY

Some implementations of the present disclosure provide a connector that consists of a body, a first slot, a second slot, a first terminal, and a second terminal. The first slot is provided on the body for receiving a first printed circuit board (PCB). The second slot is provided on the body for receiving a second PCB. The first slot and the second slot are separate and distinct slots. When the first PCB and the second PCB are received in the first slot and the second slot, respectively, the first terminal electrically connects to the first PCB and the second PCB, and the second terminal connects to only the second PCB.

In an embodiment, the first terminal is configured to connect to a top surface of the first PCB. In an embodiment, the first terminal is configured to connect to a bottom surface of the first PCB. In an embodiment, the second terminal is connected to a cable via a wire connector. The cable is electrically connected to an electronic component separate from the first PCB and the second PCB.

In an embodiment, the first terminal includes a bend connected to a first leg and a second leg, such that the first leg connects to the first PCB and the second leg connects to the second PCB. In an embodiment, the first leg of the first terminal connects to the first PCB at a connection point on the first leg. The connection point is located between the bend and an end of the first leg. In an embodiment, the second leg of the first terminal connects to the second PCB at a connection point on the second leg. The connection point is located between the bend and an end of the second leg. In an embodiment, a connection point located on the first leg of the first terminal protrudes away from the second leg of the first terminal. In an embodiment, a connection point located on the first leg of the first terminal protrudes towards the second leg of the first terminal. In an embodiment, an end of the first leg of the first terminal is wedged on a first part of the body, and an end of the second leg of the first terminal is wedged on a second part of the body, such that the first terminal is held in place by a compression of the bend by the first part of the body and the second part of the body.

In an embodiment, when either the first PCB or the second PCB are received in the first slot or the second slot, respectively, the bend is further compressed, and the first leg of the first terminal and the second leg of the first terminal move towards each other. In an embodiment, the first leg of the first terminal and the second leg of the first terminal have different lengths. In an embodiment, the second terminal includes a contact point that connects to the second PCB. The contact point is provided on a loop-shaped conductor, an arc-shaped conductor, or an L-shaped conductor.

Some implementations of the present disclosure provide a pluggable component module for connecting to a printed circuit board (PCB) of a computing system. The pluggable module includes a computer component and a connector. The connector includes a body, a first slot, a second slot, a first terminal, and a second terminal. The first slot is provided on the body for receiving a control board. The second slot is provided on the body for receiving the PCB. The first slot and the second slot are separate and distinct slots. When the control board and the PCB are received in the first slot and the second slot, respectively, the first terminal electrically connects to the control board and the PCB, and the second terminal connects to only the PCB.

In an embodiment, the control board includes an electrically erasable programmable read-only memory (EEPROM). The PCB is a fan transfer board, and the computer component is a fan. In an embodiment, the first terminal provides an electrical connection between the EEPROM and the fan transfer board, and the second terminal provides an electrical connection between the fan transfer board and the fan. In an embodiment, the control board has a smaller surface area than that of the PCB, and the first slot is smaller than the second slot. In an embodiment, most of the control board fits completely within the first slot, and less than half of the surface area of the PCB is enclosed by the second slot. In an embodiment, when the control board and the PCB are received in the first slot and the second slot, respectively, the control board is parallel to the PCB.

Some implementations of the present disclosure provide a computing system that includes a chassis, a printed circuit board (PCB) attached to the chassis, and one or more pluggable components. Each of the pluggable components includes a body, a first slot, a second slot, a first terminal, and a second terminal. The first slot is provided on the body for receiving a control board. The second slot is provided on the body for receiving the PCB. The first slot and the second slot are separate and distinct slots. When the control board and the PCB are received in the first slot and the second slot, respectively, the first terminal electrically connects the control board and the PCB, and the second terminal connects to only the PCB.

The above summary is not intended to represent each embodiment or every aspect of the present disclosure. Rather, the foregoing summary merely provides an example of some of the novel aspects and features set forth herein. The above features and advantages, and other features and advantages of the present disclosure, will be readily apparent from the following detailed description of representative embodiments and modes for carrying out the present invention, when taken in connection with the accompanying drawings and the appended claims.

BRIEF DESCRIPTION OF THE DRAWINGS

The disclosure will be better understood from the following description of embodiments together with reference to the accompanying drawings.

Figure 1:
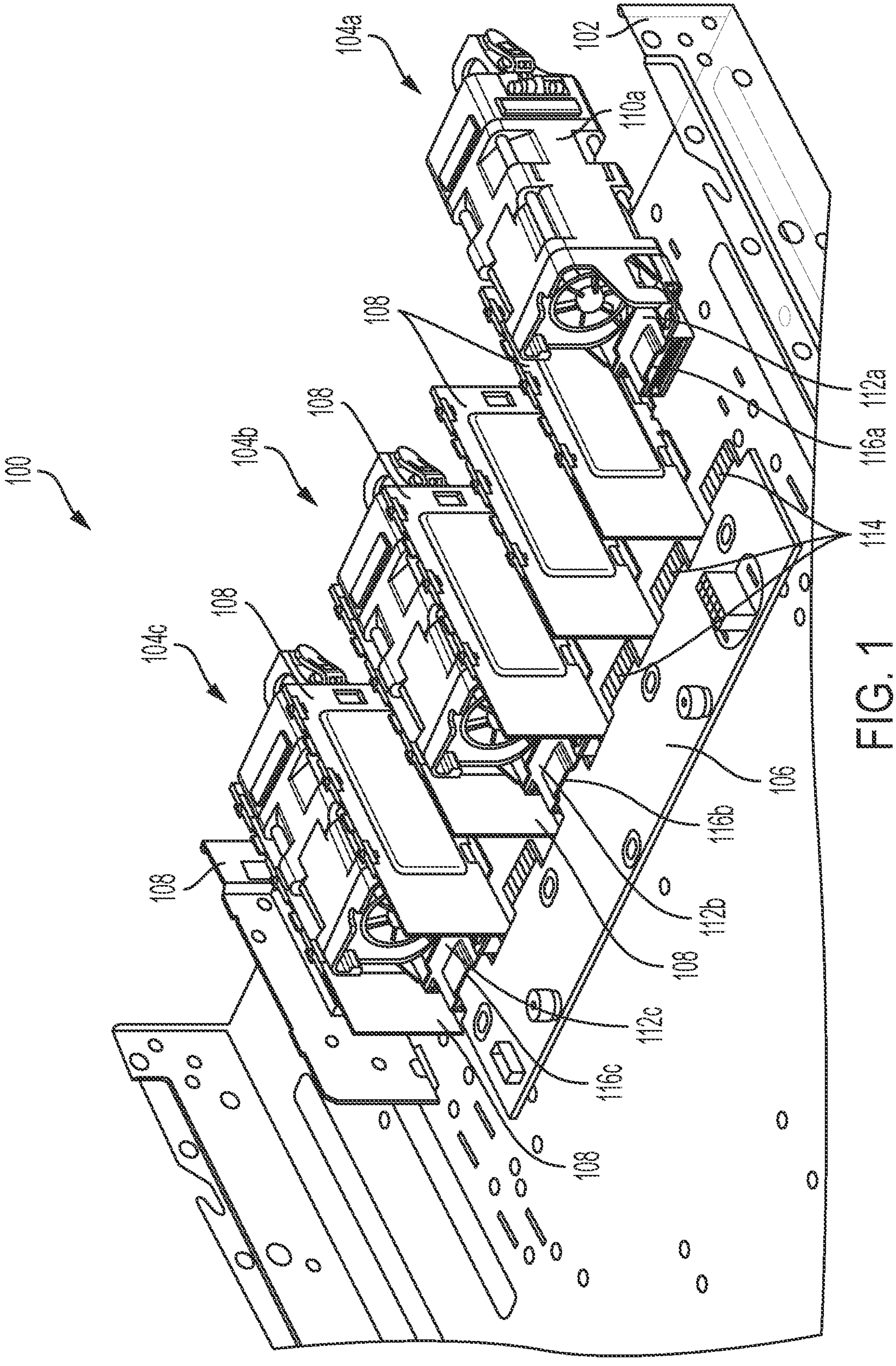
FIG. 1 illustrates a portion of a computing system, according to some implementations of the present disclosure.

The present disclosure is susceptible to various modifications and alternative forms. Some representative embodiments have been shown by way of example in the drawings and will be described in detail herein. It should be understood, however, that the invention is not intended to be limited to the particular forms disclosed. Rather, the disclosure is to cover all modifications, equivalents, and alternatives falling within the spirit and scope of the invention as defined by the appended claims.

DETAILED DESCRIPTION

The present inventions can be embodied in many different forms. Representative embodiments are shown in the drawings, and will herein be described in detail. The present disclosure is an example or illustration of the principles of the present disclosure, and is not intended to limit the broad aspects of the disclosure to the embodiments illustrated. To that extent, elements and limitations that are disclosed, for example, in the Abstract, Summary, and Detailed Description sections, but not explicitly set forth in the claims, should not be incorporated into the claims, singly or collectively, by implication, inference, or otherwise. For purposes of the present detailed description, unless specifically disclaimed, the singular includes the plural and vice versa; and the word "including" means "including without limitation." Moreover, words of approximation, such as "about," "almost," "substantially," "approximately," and the like, can be used herein to mean "at," "near," or "nearly at," or "within 3-5% of," or "within acceptable manufacturing tolerances," or any logical combination thereof, for example.

In some implementations, a control card, an electrically erasable programmable read-only memory (EEPROM), or some other memory device is used to maintain an individual identity of a pluggable computer component. The control card can serve to monitor use of the pluggable computer component. For example, a computer board (e.g., a motherboard) may have controllers that collect usage statistics of different components of a computing system. In some cases, the computer board may collect statistics on the temperature of a central processing unit (CPU) or other processors of the computing system, a fan speed of one or more fans of the computing system, real-time memory capacity of the computing system, etc. In some computing systems, the computer board may be augmented with an external or an expansion card in order to perform at least some of the aforementioned monitoring tasks. Embodiments of the present disclosure provide a connector that can receive such an expansion card, thus saving space on the computer board. The connector will also extend the lifetime of the computer board by delaying replacing the computer board. In some implementations, the expansion card can be used to monitor activities of the connector. For example, the expansion card can hold an identity of or characteristics of the connector (e.g., a serial number of the connector, components being interfaced by the connector, whether or not the connector facilitates sharing of power, a type of connector, a communication protocol of the connector, etc.).

Embodiments of the present disclosure will be described with an example of a fan, and a fan transfer board, but the present disclosure is not limited to merely the fan and the fan transfer board. The fan is used as an example as a pluggable computer component so as to highlight some advantages of some implementations of the present disclosure. Although the fan is used as an example, other pluggable computer components, for example, a monitor card module (MCM), a port interface module (PIM), a switch controller module (SCM), etc., can benefit from the present disclosure. FIG. 1 illustrates a portion of a computing system 100, according to some implementations of the present disclosure. The computing system 100 includes a chassis 102 having side walls and a bottom panel. The chassis 102 can include locations that allow installation of dividers 108 between different components. In this example, the locations may include slots that align the dividers 108 in parallel with the walls of the chassis 102.

In the chassis 102, a printed circuit board (PCB) is installed between the side walls and on the bottom panel. In some implementations, the PCB is a fan transfer board 106. One or more fan modules 104*a*, 104*b*, 104*c*, etc., can be installed on the fan transfer board 106 via connectors 112*a*, 112*b*, 112*c*, etc., respectively. The connectors 112*a*, 112*b*, 112*c*, etc., receive fingers 114 of the fan transfer board 106. The fingers 114 include terminals that electrically and mechanically connect to terminals of the connectors 112*a*, 112*b*, 112*c*, etc. The fan modules 104*b* and 104*c* are shown already installed or connected to the fan transfer board 106. The fan module 104*a* is shown unconnected to the fan transfer board 106. The fan module 104*a* includes a fan 110*a* and a connector 112*a*. The other fan modules 104*b* and 104*c* also include identical fans similar to fan 110*a*.

In some implementations, the fan transfer board 106 lacks some functionality and should be augmented. For example, the fan modules 104*a*, 104*b*, 104*c*, etc., may include newer fan technology, and the fan transfer board 106 may be an older technology configuration. Hence, in order to take advantage of new features provided by the fan modules 104*a*, 104*b*, 104*c*, etc., control cards 116*a*, 116*b*, 116*c*, etc., can be used along with the fan transfer board 106. For example, the control card 116*b* can send control signals to the fan transfer board 106 which can then relay those signals to the fan module 104*b*. Conversely, the fan module 104*b* can send signals to the fan transfer board 106 which can relay those signals to the control card 106*b*. The control card 116*b* in some implementations can instruct the fan module 104*b* to reduce fan speed in response to a level of ambient noise detected from the fan module 104*b*. The control card 116*b* can thus include a microphone or other sensors for determining the ambient noise for controlling fan speed of the fan module 104*b*.

The control cards 116*a*, 116*b*, 116*c*, etc., are PCBs with circuit components. The control cards 116*a*, 116*b*, 116*c*, etc., can include an EEPROM or some other programmable device. Each of the control cards 116*a*, 116*b*, 116*c*, etc., can have a smaller surface area than the fan transfer board 106. In some cases, due to the fan transfer board 106 being of an older technology, there may not be any expansion slots on the fan transfer board 106 to receive the control cards 116*a*, 116*b*, 116*c*, etc. As such, connectors 112*a*, 112*b*, 112*c*, etc., include a slot for receiving the control cards 116*a*, 116*b*, 116*c*, etc.

Figure 2:
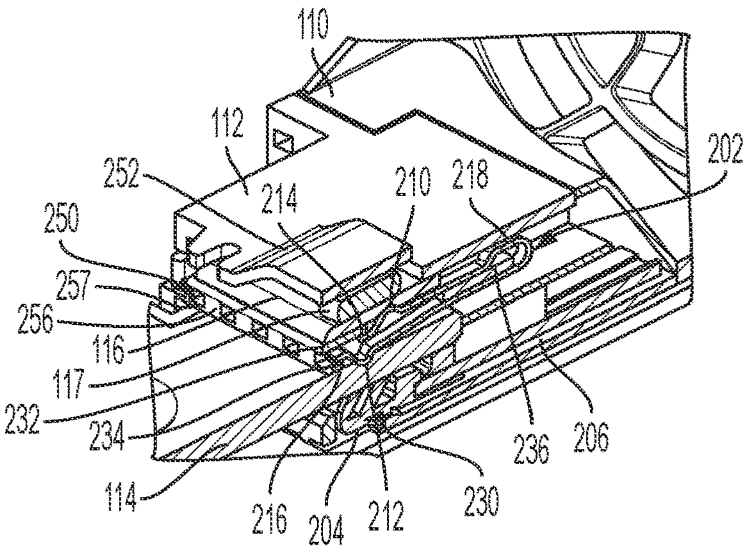
FIG. 2 illustrates an interior of an example connector, according to some implementations of the present disclosure.

The letters "a", "b", "c," etc., are used to differentiate between multiple items of a same or similar type in FIG. 1. The remaining drawings (FIGS. 2-10) only include one connector; hence, the letter labels are dropped. It is understood that the connector being described can be any one of the connectors illustrated in FIG. 1. Referring to FIG. 2, a cross-sectional cut of a connector 112 (e.g., any one of the connectors 112*a*, 112*b*, 112*c*, etc., of FIG. 1) is provided. The connector 112 is attached to a fan 110 (e.g., the fan 110*a* of FIG. 1). The connector 112 includes an already inserted or installed control board 116. The connector 112 is shown to be shaped such that circuit components 117 of the control board 116 can fit within a slot 250 (FIG. 3A) provided on the connector 112 when the control board 116 is inserted in the connector 112. An elevated portion 252 of the connector 112 provides room such that the slot 250 accommodates the circuit components 117. The connector 112 is also shown to receive the finger 114. This configuration is similar to or the same as the fan module 104*b* being connected to the fan transfer board 106 in FIG. 1.

Figure 3A:
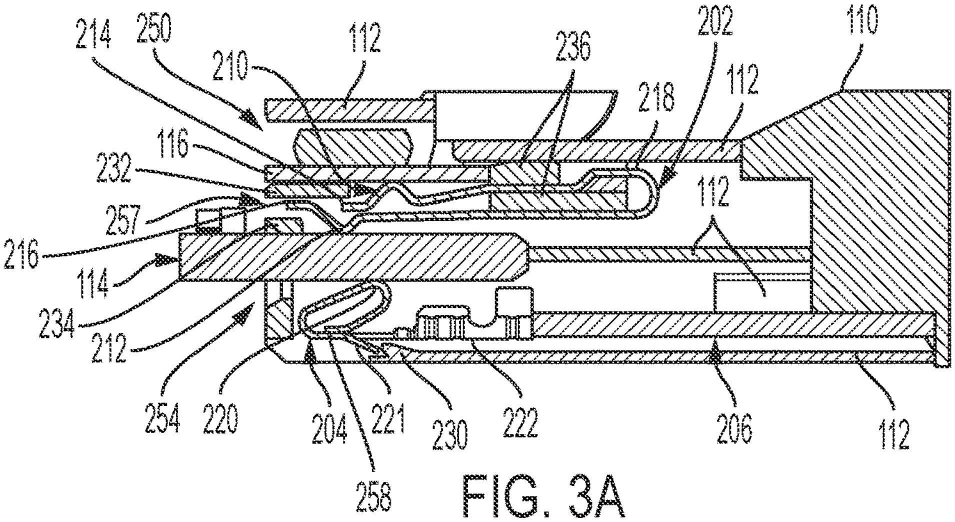
FIG. 3A illustrates a side cut of the example connector of FIG. 2.
Figure 3B:
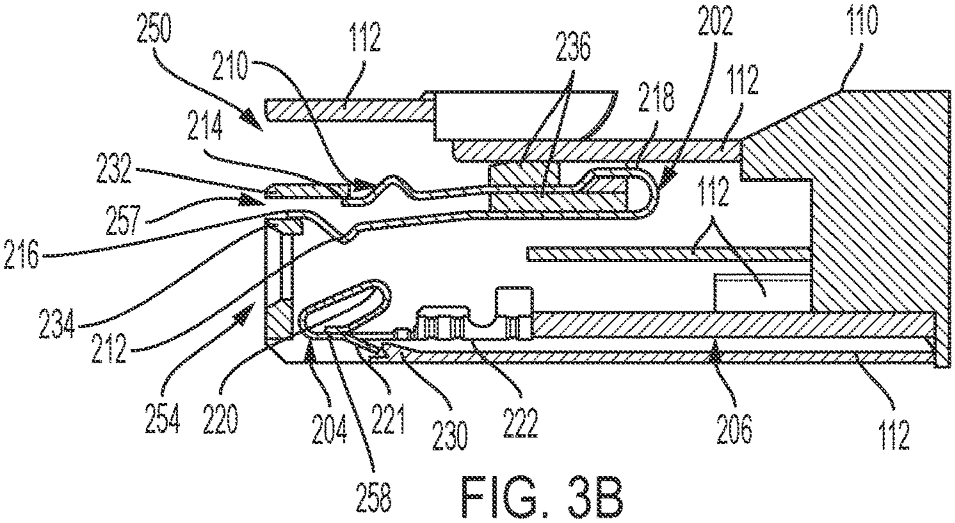
FIG. 3B illustrates a side cut of the example connector of FIG. 2 when not connected to any boards.

FIG. 3A illustrates a side view along the cross-sectional cut of the connector 112 shown in FIG. 2. FIG. 3B illustrates a view of FIG. 3A without the finger 114 and the control board 116 installed. The following discussion refers to elements having reference numbers shown in either or both FIGS. 2 and 3A. The connector 112 includes at least one upper terminal 202 and at least one lower terminal 204. In this example, one upper terminal 202 and one matching lower terminal 204 are shown.

The upper terminal 202 is provided for connecting the control board 116 to the finger 114 at a contact point 212. The upper terminal 202 is a single conductor that is bent over with two legs extending from the bend and in roughly parallel alignment with each other. Each of the two legs is not completely straight and includes deflections along the length of the leg. The deflections are around a location where the upper terminal 202 should contact a PCB, and a contact point of each of the two legs is located at the deflections. In some implementations, the upper terminal 202 includes a contact point 210 on one leg that touches the control board 116 at the bottom of the control board 116. The contact point 212 is on the other arm of the upper terminal 202. The contact points 210 and 212 are at areas where the upper terminal 202 is deflected, and therefore, the upper terminal 202 extends outward at the location of these contact points 210 and 212.

The control board 116 and the finger 114 are parallel to each other when installed in the connector 112. The control board 116 is received at the slot 250, and the finger 114 is received at a different slot 254 of the connector. Instead of having a straight metal terminal connecting the control board 116 and the finger 114, the connector 112 has the bent upper terminal 202. The upper terminal 202 includes a bend 218 that can handle some compression or pinching together of the two legs of the upper terminal 202. The upper terminal 202 has some elasticity such that the two legs of the upper terminal 202 try to move away from each other when pinched or compressed. The two legs moving apart causes two ends 214 and 216 of the legs of the upper terminal 202 to move toward a top wall 232 and a bottom wall 234 of an opening 257 provided on a panel 256 included in the body of the connector 112. The upper terminal 202 resists a pinching force that brings both legs of the upper terminal 202 together. The top wall 232 and the bottom wall 234 of the opening 257 provide mechanical stability, such that the upper terminal 202 is held in place when the finger 114 or the control board 116 is not inserted in the connector 112 (as shown in FIG. 3B). When either the finger 114 or the control board 116 is inserted in the connector 112, the upper terminal 202 is compressed, thereby bringing both legs of the upper terminal 202 closer together such that the two ends 214 and 216 of the upper terminal 202 move vertically towards each other. In some implementations, when both the finger 114 and the control board 116 are inserted in the connector 112, both legs of the upper terminal 202 are pinched towards each other, such that the two ends 214 and 216 of the upper terminal 202 are no longer in contact with the top wall 232 and the bottom wall 234 (as shown in FIG. 3A). Although the top wall 232 and the bottom wall 234 are shown separately in FIGS. 3A and 3B, note that in FIG. 2, the two walls 232 and 234 are connected to each other as they are both within a contiguous part of the panel 256 included in the connector 112.

The upper terminal 202 can be shaped such that the contact point 212 orients downwards in order to touch a top surface of the finger 114. In some implementations, the contact point 210 is oriented upwards in order to touch the bottom surface of the control board 116. In some implementations, the locations of the contact points 212 and 210 are not aligned along a same vertical axis. As such, legs of the bent upper terminal 202 can have different lengths. In the example of FIG. 3A, the leg of the upper terminal 202 having the end 214 is shorter than the leg of the upper terminal 202 having the end 216. A distance between the contact point 212 and the end 216 is comparable to a distance between the contact point 210 and the end 214. A distance between the contact point 210 and the bend 218 is less than a distance between the contact point 212 and the bend 218. As such, where the contact points 212 and 210 are located can dictate lengths of the two legs of the upper terminal 202. The connector 112 can include a separator or holder 236 for electrically isolating or separating upper terminals, such as the upper terminal 202, from each other.

The lower terminal 204 includes a contact 220 for connecting a bottom surface of the finger 114 to the lower terminal 204. The lower terminal 204 can be connected to a cable 206 via a wire connector 222. The cable 206 can be an electrical interface to the fan 110. The electrical connection between the fan 110 and the control board 116 can thus be described as having the upper terminal 202, the finger 114, and the lower terminal 204 as intermediaries. The lower terminal 204 can include a loop with a contact point 212 for making contact to the bottom surface of the finger 114. The loop can be mostly oval in shape. Although an oval shape is provided in FIGS. 3A and 3B, in some implementations, the loop can be an open loop, an arc, a circle, an L-shaped connector, etc. In FIG. 3B, the loop of the lower terminal 204 is provided at an angle (e.g., a 30 degree angle, a 45 degree angle, etc.) from the cable 206. The angle facilitates movement or further angling of the loop in response to the finger 114 being inserted in the connector 112. When the finger 114 is inserted in the connector 112, the angle from the cable 206 is reduced, since the finger 114 pushes down on the loop at the contact 220 (as shown in FIG. 3A). The loop can include a free end 258 that facilitates the further movement or angling of the loop. Thus, the free end 258 prevents the loop from being a stiff, rigid, and unmoving part.

The lower terminal 204 can include a lip 221. The connector 112 can include a catch 230 for catching the lip 221, thus preventing the lower terminal 204 from moving laterally towards the fan 110. The lip 221 prevents the lower terminal 204 from moving towards the fan 110 when the finger 114 is inserted in the slot 254.

Figure 4:
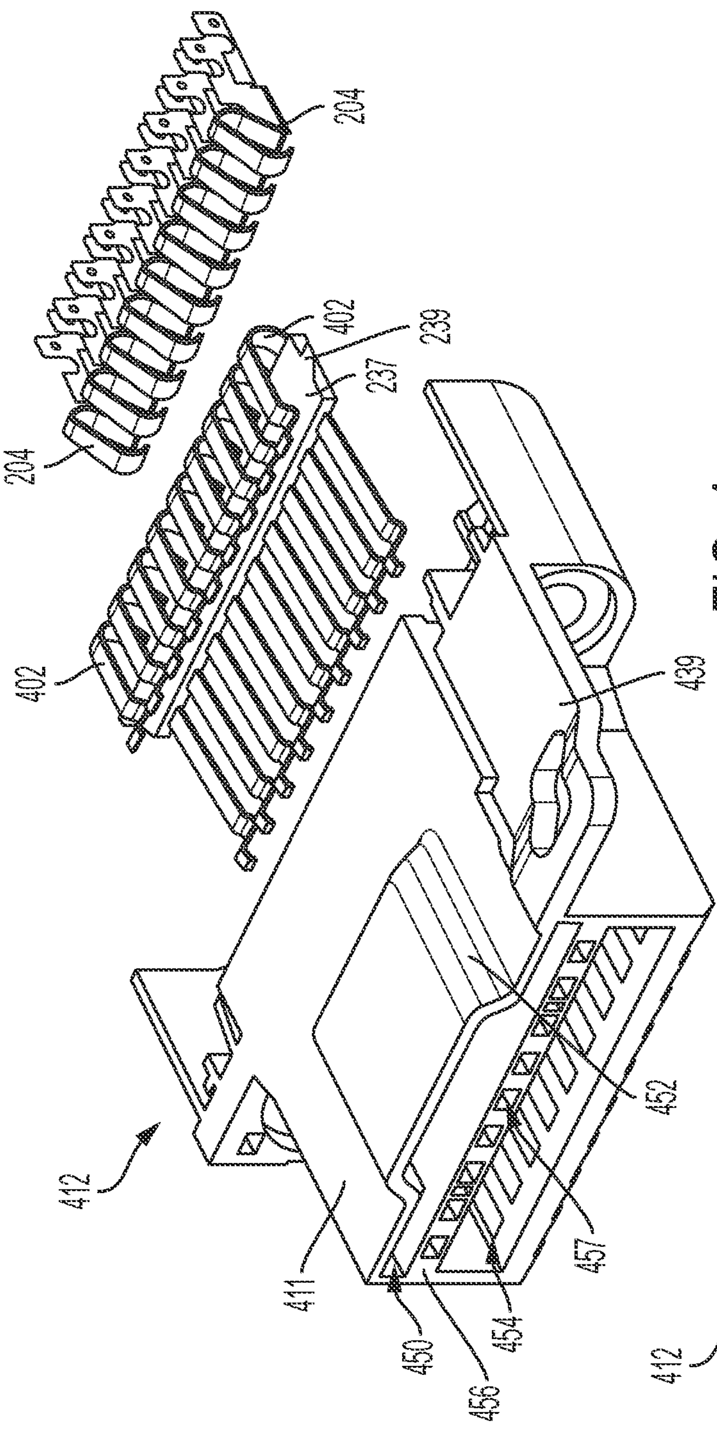
FIG. 4 illustrates an exploded view of the elements of another example connector, according to some implementations of the present disclosure.

FIG. 4 illustrates elements of a connector 412, according to some implementations of the present disclosure. The connector 412 can include a body 411 that receives a row of upper terminals 402 and a row of lower terminals 204. The body 411 includes a horizontal panel 456 that separates a slot 450 and a slot 454. The horizontal panel 456 is similar to or the same as the panel 256 (FIG. 2). The slot 450 is similar to the slot 250 (FIG. 3A), and the slot 454 is similar to the slot 254 (FIG. 3A). The body 411 includes an elevated portion 452 that shapes the slot 450 to fit circuit components of a PCB that fits in the slot 450. The horizontal panel 456 includes openings 457, which are similar to the openings 257 (FIG. 2). The body 411 includes a handle 439. The handle 439 can span a side of the body 411.

Figure 5:
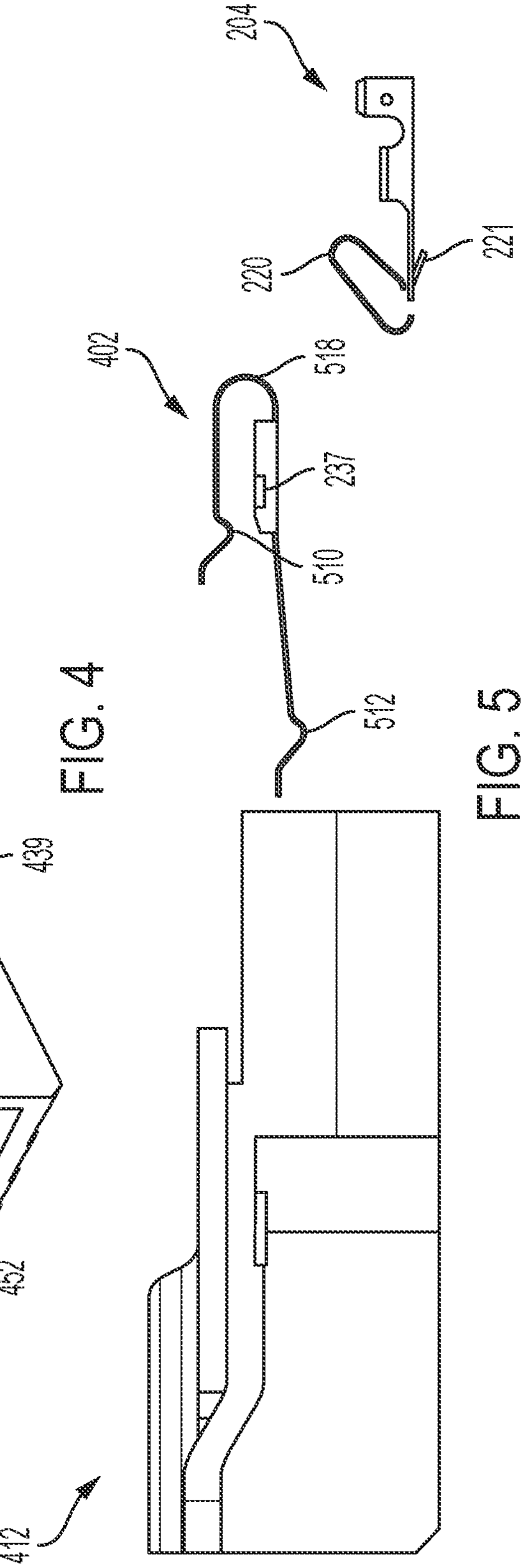
FIG. 5 illustrates a side view of the elements of the connector of FIG. 4.

FIG. 5 illustrates a side view of the elements of the connector 412 of FIG. 4. The lower terminals 204 in FIGS. 4 and 5 are similar to or the same as the lower terminal 204, as described above with respect to FIGS. 2 3A, and 3B. The upper terminals 402 of FIGS. 4 and 5 have a slightly different configuration than the upper terminals of FIGS. 2, 3A, and 3B. Furthermore, a separator or holder 237 is provided to electrically separate the upper terminals 402. The separator or holder 237 is a non-conductive member that includes slots that each hold one of the upper terminals 402. The upper terminals 402 can be prevented from sliding laterally towards each other by the separator or holder 237. The holder 237 can also include a handle 239.

Each of the upper terminals 402 includes a bend 518, similar to the bend 218 of FIGS. 2, 3A, and 3B. One leg of the upper terminal 402 can be longer than the other leg. The upper terminal 402 includes contact points 510 and 512 on the respective legs. The contact point 510 makes contact with a control board (not shown) when the control board is inserted in the connector 412. The contact point 512 makes contact with a finger similar to the finger 114 shown in FIG. 2 when the finger is inserted in the connector 412. The contact point 510 makes contact with a top surface of the control board, and the contact point 512 makes contact with a top surface of the finger. This is different from the configuration of FIGS. 2, 3A, and 3B where the upper terminal 202 has the contact point 210 for making connection with the bottom surface of the control board 116. In contrast, since the contact point 510 of the upper terminal 402 makes contact with the top surface of the control board, the contact point 510 orients downward towards the other leg of the upper terminal 402.

The separator or holder 237 is shown flush with the upper terminal 402 in FIGS. 4-5. To achieve this flush configuration, the separator or holder 237 can include cutouts such that each of the upper terminals 402 fits in a respective cutout.

Figure 6:
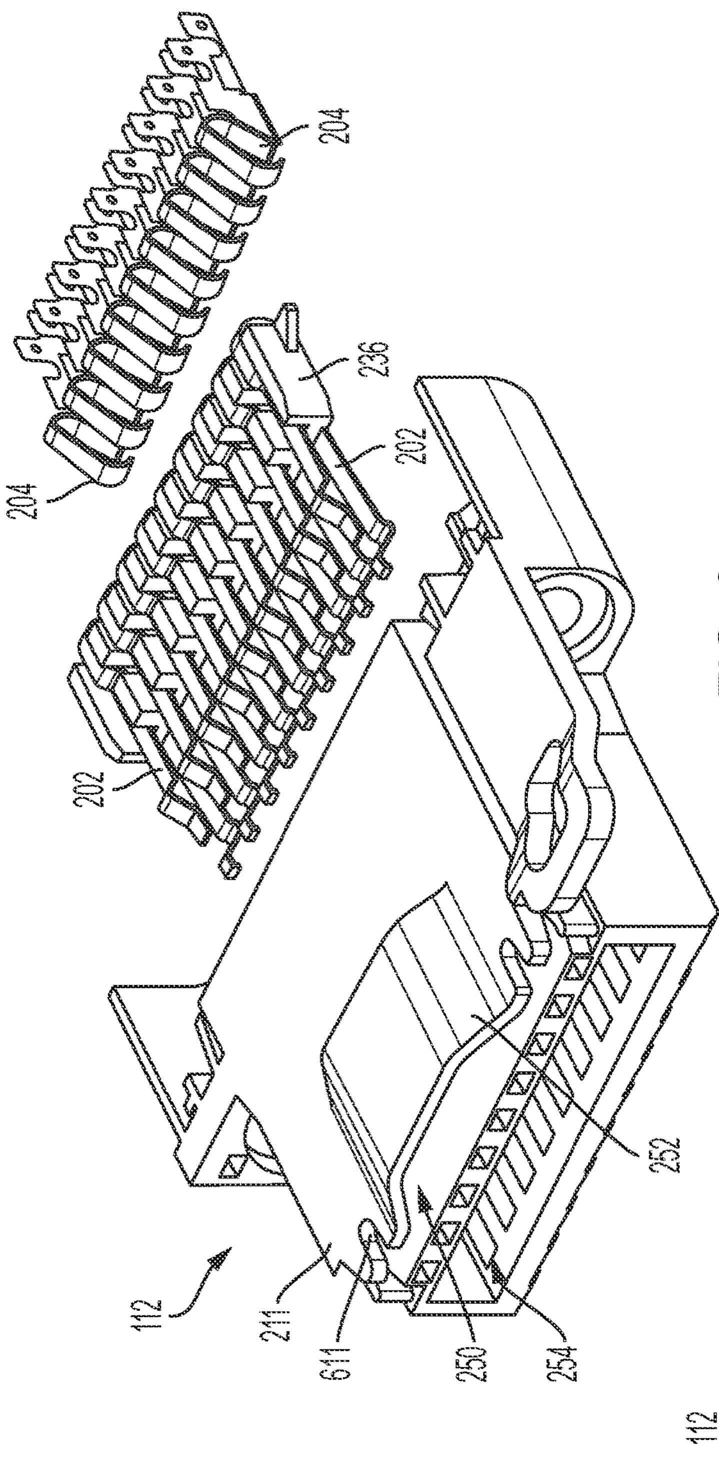
FIG. 6 illustrates an exploded view of the elements of another example connector, according to some implementations of the present disclosure.
Figure 7:
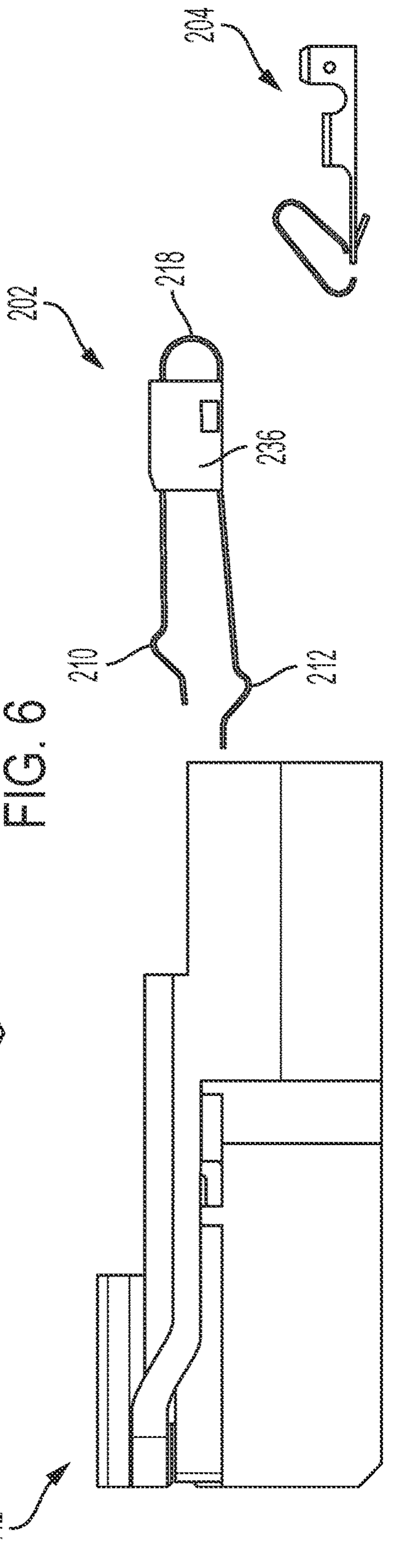
FIG. 7 illustrates a side view of the elements of the connector of FIG. 6.

FIG. 6 illustrates elements of the connector 112, according to some implementations of the present disclosure. The connector 112 is similar to or the same as the connector 112, as described above with respect to FIGS. 2, 3A, and 3B. The connector 112 includes a row of the upper terminals 202 and a row of the lower terminals 204. The connector 112 includes a body 211 with the elevated portion 252. The body 211 can include one or more notches 611 that allow a person to quickly see whether a PCB board is inserted the slot 250. The separator or holder 236 is provided to electrically isolate the upper terminals 202 from each other, and to mechanically prevent the upper terminals 202 from moving laterally towards each other. FIG. 7 illustrates a side view of the elements of the connector 112 of FIG. 6. The upper terminal 202 contacts a bottom surface of a control card at the contact point 210 (see e.g., FIG. 2) and a top surface of a finger at the contact point 212 (see e.g., FIG. 2).

Figure 8:
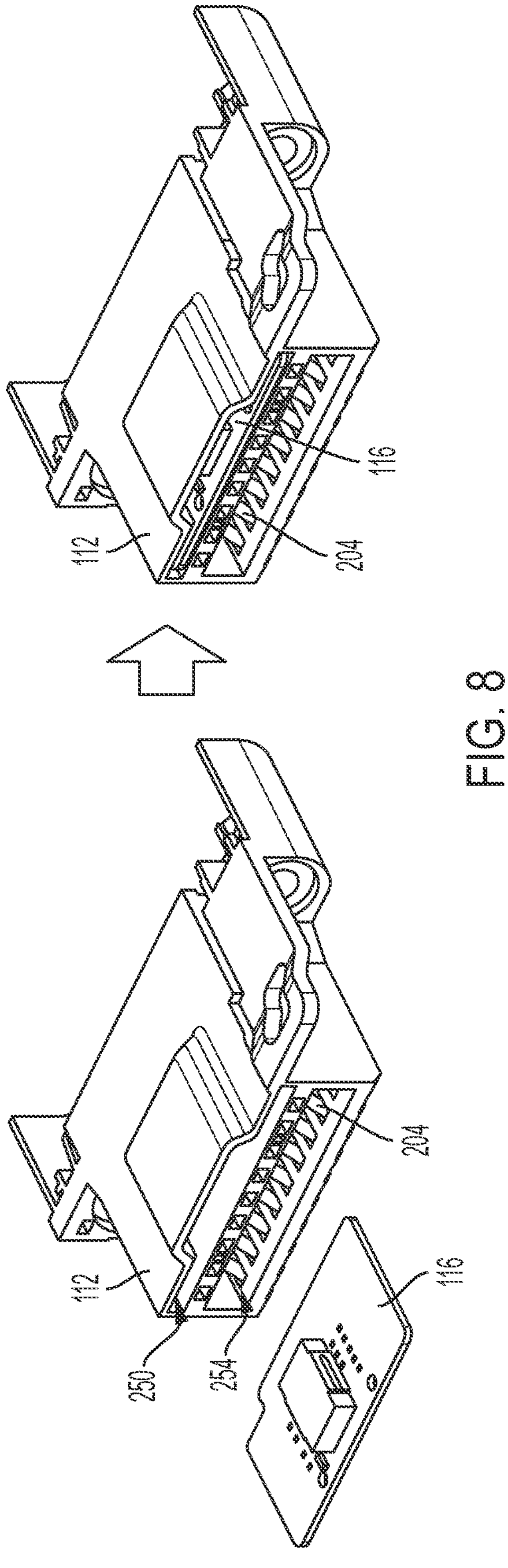
FIG. 8 illustrates a circuit board being inserted in an example connector, according to some implementations of the present disclosure.
Figure 9:
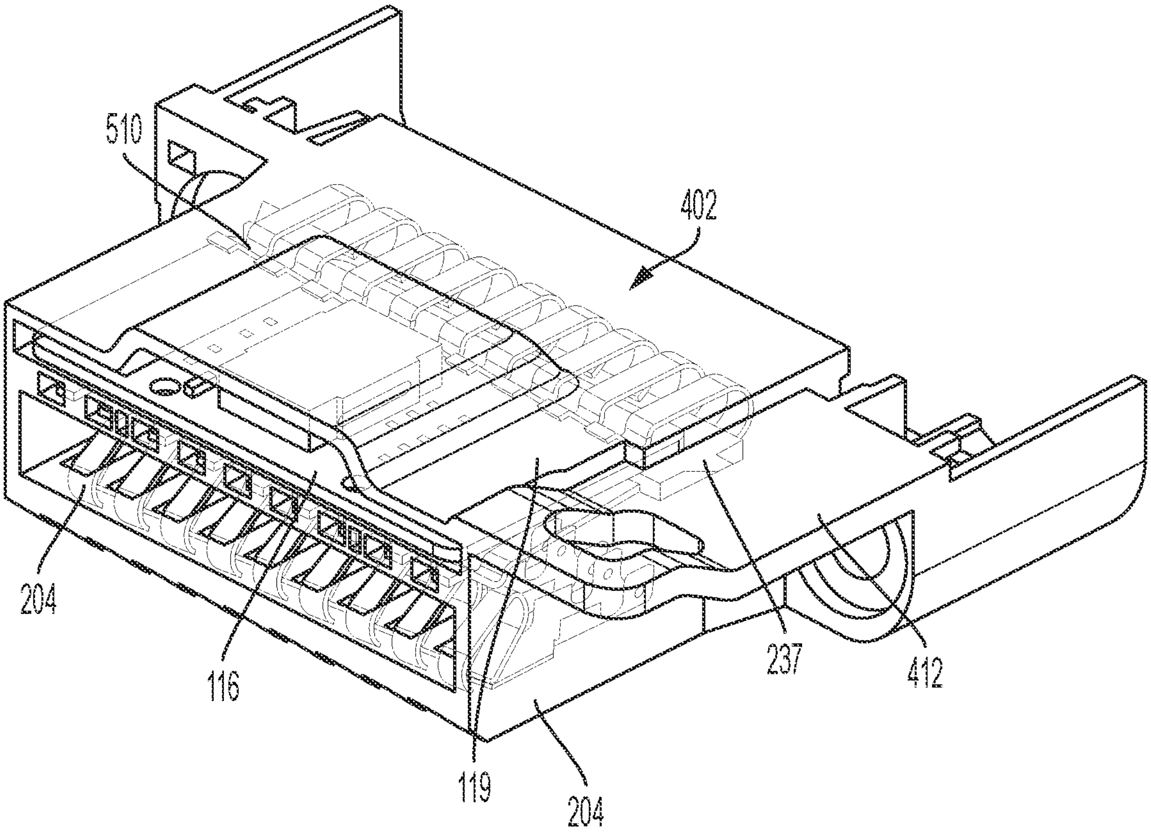
FIG. 9 illustrates a circuit board inserted in the connector of FIG. 4, where the circuit board is in contact with terminals within the connector, according to some implementations of the present disclosure.
Figure 10:
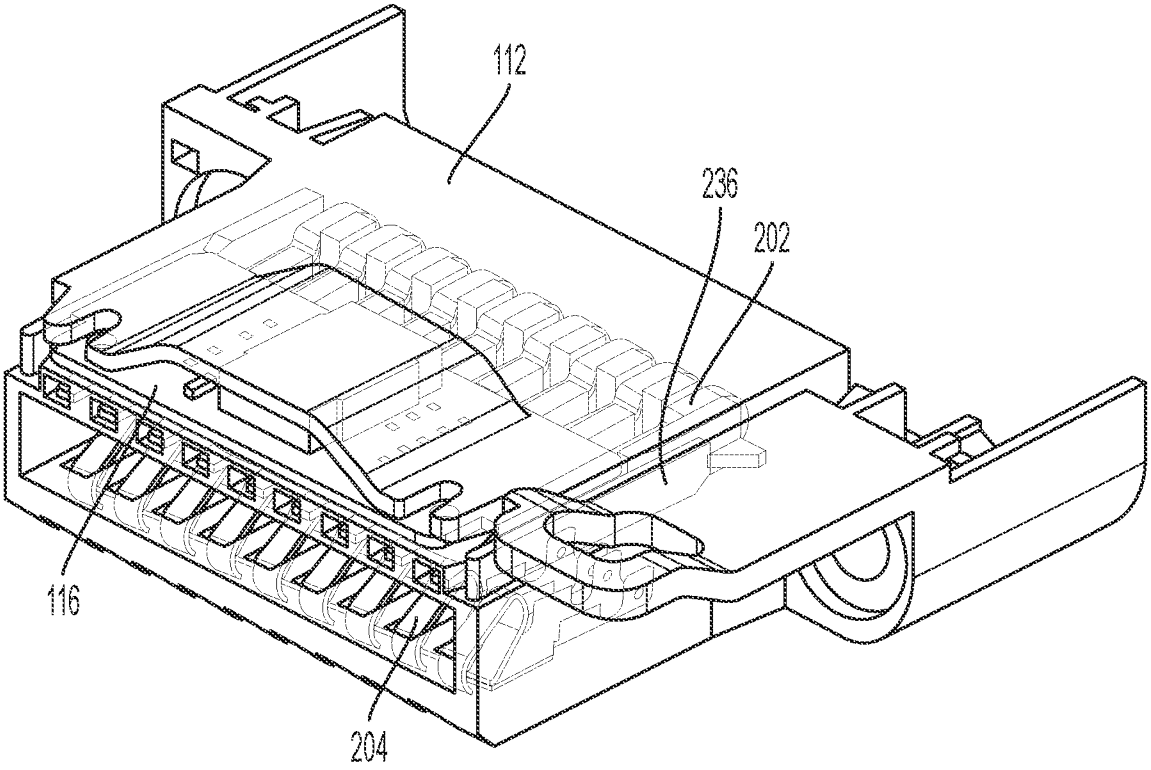
FIG. 10 illustrates a circuit board inserted in the connector of FIG. 6, where the circuit board is in contact with terminals within the connector, according to some implementations of the present disclosure.

FIG. 8 illustrates the circuit board 116 being inserted in the connector 112, according to some implementations of the present disclosure. The circuit board 116 is shown to be received at the upper slot 250 provided on the connector 112. The lower slot 254 of the connector 112 is left empty such that the lower terminals 204 are visible. When inserted, the circuit board 116 can be connected to upper terminals in the connector 112. FIGS. 9 and 10 illustrate different connections based on the upper terminals provided in the connector.

FIG. 9 illustrates the circuit board 116 inserted in the connector 412. The circuit board 116 is in contact with upper terminals 402 within the connector 412, according to some implementations of the present disclosure. The connector 412 is similar to or the same as the connector 412 discussed above in connection with FIGS. 4 and 5. The upper terminals 402 (at the contact points 510) make contact with a top surface 119 of the circuit board 116.

FIG. 10 illustrates the circuit board 116 inserted in the connector 112. The circuit board 116 is in contact with the upper terminals 202 within the connector 112, according to some implementations of the present disclosure. The upper terminals 202 make contact with a bottom surface of the circuit board 116. The contact points are not shown since the perspective view is being blocked, but the configuration in FIG. 10 is similar to or the same as the configuration in FIGS. 2, 3A, and 3B.

Although the fan module is used as an example, connectors designed according to some implementations of the present disclosure can used for any pluggable component (e.g., an MCM, a PIM, an SCM, etc.). Functionality of the pluggable component can be augmented with a connector that includes a slot for receiving a control card, according to some implementations of the present disclosure.

As used in this application, the terms "component," "module," "system," or the like, generally refer to a computer-related entity, either hardware (e.g., a circuit), a combination of hardware and software, software, or an entity related to an operational machine with one or more specific functionalities. For example, a component may be, but is not limited to being, a process running on a processor (e.g., digital signal processor), a processor, an object, an executable, a thread of execution, a program, and/or a computer. By way of illustration, both an application running on a controller, as well as the controller, can be a component. One or more components may reside within a process and/or thread of execution, and a component may be localized on one computer and/or distributed between two or more computers. Further, a "device" can come in the form of specially designed hardware; generalized hardware made specialized by the execution of software thereon that enables the hardware to perform specific function; software stored on a computer-readable medium; or a combination thereof.

The terminology used herein is for the purpose of describing particular embodiments only, and is not intended to be limiting of the invention. As used herein, the singular forms "a," "an," and "the" are intended to include the plural forms as well, unless the context clearly indicates otherwise. Furthermore, to the extent that the terms "including," "includes," "having," "has," "with," or variants thereof, are used in either the detailed description and/or the claims, such terms are intended to be inclusive in a manner similar to the term "comprising."

Unless otherwise defined, all terms (including technical and scientific terms) used herein have the same meaning as commonly understood by one of ordinary skill in the art. Furthermore, terms, such as those defined in commonly used dictionaries, should be interpreted as having a meaning that is consistent with their meaning in the context of the relevant art, and will not be interpreted in an idealized or overly formal sense unless expressly so defined herein.

While various embodiments of the present invention have been described above, it should be understood that they have been presented by way of example only, and not limitation. Although the invention has been illustrated and described with respect to one or more implementations, equivalent alterations and modifications will occur or be known to others skilled in the art upon the reading and understanding of this specification and the annexed drawings. In addition, while a particular feature of the invention may have been disclosed with respect to only one of several implementations, such feature may be combined with one or more other features of the other implementations as may be desired and advantageous for any given or particular application. Thus, the breadth and scope of the present invention should not be limited by any of the above described embodiments. Rather, the scope of the invention should be defined in accordance with the following claims and their equivalents.

What is claimed is:

1. A pluggable component module for connecting to a printed circuit board (PCB) of a computing system, the pluggable component module comprising:

a computer component; and a connector, comprising:

a body;

a first slot provided on the body for receiving a control board;

a second slot provided on the body for receiving the PCB, the first slot and the second slot being separate and distinct slots;

a first terminal configured to connect to a top surface of the PCB; and a second terminal, wherein when the control board and the PCB are received in the first slot and the second slot, respectively, the first terminal electrically connects to the control board and the PCB, and the second terminal connects to only the PCB;

wherein the control board includes an electrically erasable programmable read-only memory (EEPROM), and wherein the PCB is a fan transfer board, and the computer component is a fan.

2. The pluggable component module of claim 1, wherein the first terminal provides an electrical connection between the EEPROM and the fan transfer board, and the second terminal provides an electrical connection between the fan transfer board and the fan.

3. The pluggable component module of claim 1, wherein the control board has a smaller surface area than that of the PCB, and the first slot is smaller than the second slot.

4. The pluggable component module of claim 3, wherein most of the control board completely fits within the first slot and less than half of the surface area of the PCB is enclosed by the second slot.

5. The pluggable component module of claim 1, wherein when the control board and the PCB are received in the first slot and the second slot, respectively, the control board is parallel to the PCB.

6. A pluggable component module for connecting to a printed circuit board (PCB) of a computing system, the pluggable component module comprising:

a computer component; and a connector, comprising:

a body;

a first slot provided on the body for receiving a control board;

a second slot provided on the body for receiving the PCB, the first slot and the second slot being separate and distinct slots;

a first terminal configured to connect to a bottom surface of the PCB; and a second terminal, wherein when the control board and the PCB are received in the first slot and the second slot, respectively, the first terminal electrically connects to the control board and the PCB, and the second terminal connects to only the PCB;

wherein the control board includes an electrically erasable programmable read-only memory (EEPROM), and wherein the PCB is a fan transfer board, and the computer component is a fan.

7. The pluggable component module of claim 6, wherein the first terminal includes a bend connected to a first leg and a second leg, an end of the first leg being wedged on a first part of the body and an end of the second leg being wedged on a second part of the body, the first terminal being held in place by a compression of the bend.

8. The pluggable component module of claim 7, wherein when the PCB is received in the first slot or the second slot, respectively, the bend is further compressed and the first leg of the first terminal and the second leg of the first terminal move towards each other.

9. A pluggable component module for connecting to a printed circuit board (PCB) of a computing system, the pluggable component module comprising a connector that includes:

a body having a first slot for receiving a control board and a second slot for receiving the PCB;

a first terminal configured to connect to a top surface of the PCB; and a second terminal, wherein when the control board and the PCB are received in the first slot and the second slot, respectively, the first terminal electrically connects to the control board and the PCB, and the second terminal connects to only the PCB;

wherein the control board has a smaller surface area than that of the PCB, and the first slot is smaller than the second slot.

10. A pluggable component module for connecting to a printed circuit board (PCB) of a computing system, the pluggable component module comprising a connector that includes:

a body having a first slot for receiving a control board and a second slot for receiving the PCB;

a first terminal configured to connect to a bottom surface of the PCB; and a second terminal, wherein when the control board and the PCB are received in the first slot and the second slot, respectively, the first terminal electrically connects to the control board and the PCB, and the second terminal connects to only the PCB;

wherein the control board has a smaller surface area than that of the PCB, and the first slot is smaller than the second slot.

* * * * *